(12) United States Patent
Jayaraman et al.

(10) Patent No.: US 12,041,001 B2
(45) Date of Patent: Jul. 16, 2024

(54) UNIFIED SOUNDING REFERENCE SIGNAL INPUT/OUTPUT FUNCTIONALITY

(71) Applicant: SKYWORKS SOLUTIONS, INC., Irvine, CA (US)

(72) Inventors: Srivatsan Jayaraman, Santa Clara, CA (US); Anand Raghavan, Middleton, WI (US); Jin Hoon Cho, Newbury Park, CA (US); Lige Wang, Irvine, CA (US)

(73) Assignee: SKYWORKS SOLUTIONS, INC., Irvine, CA (US)

( * ) Notice: Subject to any disclaimer, the term of this patent is extended or adjusted under 35 U.S.C. 154(b) by 348 days.

(21) Appl. No.: 17/583,823

(22) Filed: Jan. 25, 2022

(65) Prior Publication Data
US 2022/0239430 A1 Jul. 28, 2022

Related U.S. Application Data

(60) Provisional application No. 63/142,264, filed on Jan. 27, 2021.

(51) Int. Cl.
*H04L 5/00* (2006.01)
*H04B 1/40* (2015.01)
(52) U.S. Cl.
CPC ............. *H04L 5/0048* (2013.01); *H04B 1/40* (2013.01)

(58) Field of Classification Search
CPC ................................ H04L 5/0048; H04B 1/40
See application file for complete search history.

(56) References Cited

U.S. PATENT DOCUMENTS 9,814,003 B2 * 11/2017 Xu .......................... H04L 1/1671
2022/0116085 A1 * 4/2022 Kim ...................... H04B 17/103

FOREIGN PATENT DOCUMENTS

WO    WO-2020069269 A1 *  4/2020  ........... H04L 5/0048

* cited by examiner

*Primary Examiner* — Duc C Ho
(74) *Attorney, Agent, or Firm* — Lando & Anastasi, LLP (57) ABSTRACT

Aspects of the disclosure provide a front-end module for a wireless device comprising at least one transmit path configured to provide a first sounding reference signal, at least one transmit/receive path coupled to at least one antenna port, a sounding-reference-signal port configured to provide the first sounding reference signal and to receive a second sounding reference signal, an antenna switching module coupled between the at least one transmit path, the at least one transmit/receive path, and the sounding-reference-signal port, the antenna switching module being configured to provide the first sounding reference signal from the transmit path to the at least one transmit/receive path and the sounding-reference-signal port and to provide the second sounding reference signal received at the sounding-reference-signal port to the at least one transmit/receive path.

20 Claims, 4 Drawing Sheets

UNIFIED SOUNDING REFERENCE SIGNAL INPUT/OUTPUT FUNCTIONALITY

CROSS-REFERENCE TO RELATED APPLICATIONS

This application claims priority to U.S. Provisional Application Ser. No. 63/142,264, titled "UNIFIED SOUNDING REFERENCE SIGNAL INPUT/OUTPUT FUNCTIONALITY," filed on Jan. 27, 2021, which is hereby incorporated by reference in its entirety.

BACKGROUND

The present disclosure relates generally to front-end modules (FEM). Some examples relate to systems and methods for improving sounding reference signal functionality in FEM architectures.

SUMMARY

According to at least one aspect of the present disclosure, a front-end module for a wireless device is provided comprising at least one transmit path configured to provide a first sounding reference signal, at least one transmit/receive path coupled to at least one antenna port, a sounding-reference-signal port configured to provide the first sounding reference signal and to receive a second sounding reference signal, an antenna switching module coupled between the at least one transmit path, the at least one transmit/receive path, and the sounding-reference-signal port, the antenna switching module being configured to provide the first sounding reference signal from the transmit path to the at least one transmit/receive path and the sounding-reference-signal port and to provide the second sounding reference signal received at the sounding-reference-signal port to the at least one transmit/receive path.

In some examples, the first sounding reference signal and the second sounding reference signal are provided to the at least one transmit/receive path to be transmitted by one or more antennas coupled to the at least one antenna port. In at least one example, the first sounding reference signal and the second sounding reference signal are transmitted to at least one base station to characterize an uplink channel between the wireless device and the base station. In various examples, the first sounding reference signal is provided from the sounding-reference-signal port to a second front-end module included in the wireless device. In some examples, the second sounding reference signal is received from the second front-end module.

In at least one example, the at least one transmit path includes at least one power amplifier. In various examples, the at least one receive path includes at least one low-noise amplifier. In some examples, the front-end module is configured to support 5G wireless communication. In at least one example, the antenna switch module includes a single pin connection configured to be coupled to the sounding-reference-signal port.

According to at least one aspect of the disclosure, a mobile-communications-device system is provided comprising a first front-end module including a first sounding-reference-signal port configured to provide a first sounding reference signal and to receive a second sounding reference signal, and a first antenna switching module coupled to the first sounding-reference-signal port, the first antenna switching module being configured to route the first sounding reference signal to the first sounding-reference-signal port and to route the second sounding reference signal from the first sounding-reference-signal port, and a second front-end module including a second sounding-reference-signal port configured to provide the second sounding reference signal to the first front-end module and to receive the first sounding reference signal from the first front-end module, and a second antenna switching module coupled to the second sounding-reference-signal port, the second antenna switching module being configured to route the second sounding reference signal to the second sounding-reference-signal port and to route the first sounding reference signal from the second sounding-reference-signal port.

In some examples, the first front-end module includes at least one first transmit path coupled to the first antenna switch module, the first antenna switch module being configured to route the first sounding reference signal from the at least one first transmit path to the first sounding-reference-signal port, and the second front-end module includes at least one second transmit path coupled to the second antenna switch module, the second antenna switch module being configured to route the second sounding reference signal from the at least one second transmit path to the second sounding-reference-signal port. In at least one example, the first front-end module includes at least one first transmit/receive path coupled to at least one first antenna port and coupled to the first antenna switch module, the first antenna switch module being configured to route the second sounding reference signal from the first sounding-reference-signal port to the at least one first transmit/receive path, and the second front-end module includes at least one second transmit/receive path coupled to at least one second antenna port and coupled to the second antenna switch module, the second antenna switch module being configured to route the first sounding reference signal from the second sounding-reference-signal port to the at least one second transmit/receive path.

In various examples, the first sounding reference signal is provided to the at least one first antenna port to be transmitted by one or more first antennas coupled to the at least one first antenna port, and the second sounding reference signal is provided to the at least one second antenna port to be transmitted by one or more second antennas coupled to the at least one second antenna port. In some examples, the first sounding reference signal and the second sounding reference signal are transmitted to at least one base station to characterize an uplink channel between the mobile-communications-device system and the at least one base station. In at least one example, the first antenna switch module includes a single pin connection configured to be coupled to the first sounding-reference-signal port and the second antenna switch module includes a single pin connection configured to be coupled to the second sounding-reference-signal port.

According to at least one example of the disclosure, a non-transitory computer-readable medium storing thereon sequences of computer-executable instructions for controlling a front-end module for a wireless device comprising a sounding-reference-signal port, at least one transmit path, at least one transmit/receive path coupled to at least one antenna port, and an antenna switching module coupled between the sounding-reference-signal port, the at least one transmit path, and the at least one transmit/receive path is provided, the sequences of computer-executable instructions including instructions that instruct at least one processor to control the antenna switching module to route a first sounding reference signal from the at least one transmit path to the sounding-reference-signal port, and control the antenna switching module to route a second sounding reference signal from the sounding-reference-signal port to the at least one transmit/receive port.

In some examples, the instructions instruct the at least one processor to route the first sounding reference signal and the second sounding reference signal to the at least one transmit/receive path to be transmitted by one or more antennas coupled to the at least one antenna port. In at least one example, the wireless device includes a transceiver, and the instructions instruct the at least one processor to route the first sounding reference signal from the transceiver and to route the second sounding reference signal to the transceiver. In various examples, the instructions instruct the at least one processor to provide the first sounding reference signal from, and receive the second sounding reference signal at, a single pin coupled to the sounding-reference-signal port. In some examples, the instructions further instruct the at least one processor to operate the front-end module pursuant to a 5G wireless-communication standard.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. In the figures, each identical or nearly identical component that is illustrated in various figures is represented by a like numeral. For purposes of clarity, not every component may be labeled in every figure. In the figures.

DETAILED DESCRIPTION

Examples of the methods and systems discussed herein are not limited in application to the details of construction and the arrangement of components set forth in the following description or illustrated in the accompanying drawings. The methods and systems are capable of implementation in other embodiments and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items.

References to "or" may be construed as inclusive so that any terms described using "or" may indicate any of a single, more than one, and all of the described terms. In addition, in the event of inconsistent usages of terms between this document and documents incorporated herein by reference, the term usage in the incorporated features is supplementary to that of this document; for irreconcilable differences, the term usage in this document controls.

Figure 1:
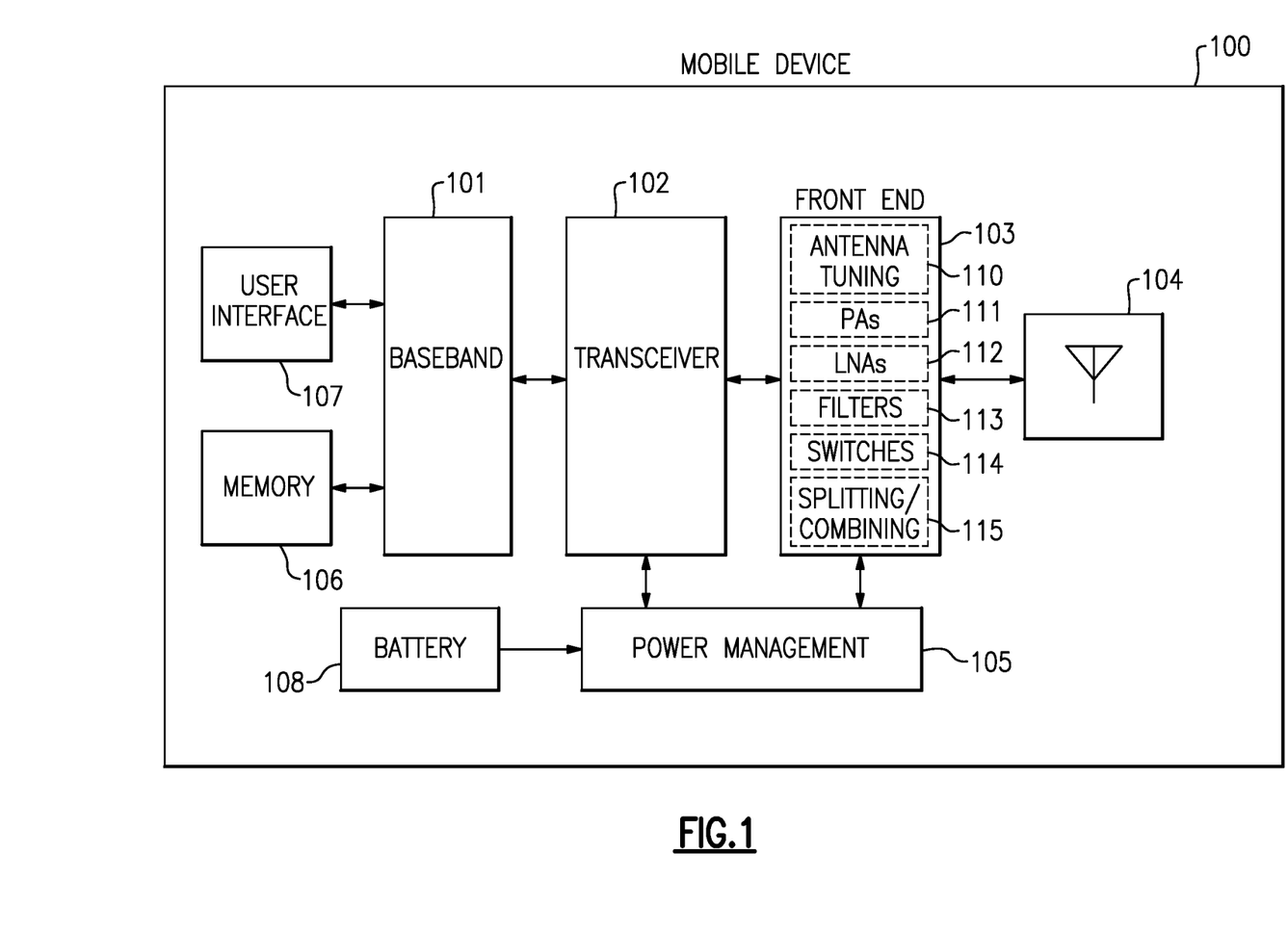
FIG. 1 illustrates a block diagram of a front-end module according to an example.

Examples of the disclosure may relate to front-end modules (FEMs) implemented in connection with one or more communication devices, such as mobile communication devices. FIG. 1 illustrates a schematic diagram of a mobile device 100 according to an example. The mobile device 100 includes a baseband system 101, a transceiver 102, a front-end module 103 ("FEM 103"), antennas 104, a power-management system 105, a memory 106, a user interface 107, and a battery 108.

The mobile device 100 can be used to communicate using a wide variety of communications technologies, including, but not limited to, 2G, 3G, 4G (including LTE, LTE-Advanced, and LTE-Advanced Pro), 5G NR, WLAN (for instance, Wi-Fi), WPAN (for instance, Bluetooth and Zig-Bee), WMAN (for instance, WiMax), GPS technologies, and/or other communications technologies.

The transceiver 102 may generate RF signals for transmission via the antennas 104 and process incoming RF signals received from the antennas 104. It will be understood that various functionalities associated with the transmission and receiving of RF signals can be achieved by one or more components that are collectively represented in FIG. 1 as the transceiver 102. In one example, separate components (for instance, separate circuits or dies) can be provided for handling certain types of RF signals.

The FEM 103 aids in conditioning signals transmitted to and/or received from the antennas 104. In the illustrated embodiment, the FEM 103 includes antenna-tuning circuitry 110, power amplifiers (PAs) 111, low-noise amplifiers (LNAs) 112, filters 113, switches 114, and signal splitting/combining circuitry 115. However, other implementations are possible. The filters 113 can include one or more filter circuits with harmonic rejection that include one or more features of the examples disclosed herein. In some examples, the FEM 103 may be a FEM system having multiple FEMs.

For example, the FEM 103 can provide a number of functionalities, including, but not limited to, amplifying signals for transmission, amplifying received signals, filtering signals, switching between different bands, switching between different power modes, switching between transmission and receiving modes, duplexing of signals, multiplexing of signals (for instance, diplexing or triplexing), transmitting and/or receiving SRS signals, or some combination thereof. The antennas 104 can include antennas used for a wide variety of types of communications. For example, the antennas 104 can include antennas for transmitting and/or receiving signals associated with a wide variety of frequencies, including RF signals, and communications standards.

The antennas 104 may include one or more antennas. In certain implementations, the antennas 104 support Multiple Input Multiple Output (MIMO) communications and/or switched diversity communications. For example, MIMO communications use multiple antennas for communicating multiple data streams over a single radio-frequency channel. MIMO communications benefit from higher signal-to-noise ratio, improved coding, and/or reduced signal interference due to spatial multiplexing differences of the radio environment. Switched diversity refers to communications in which a particular antenna is selected for operation at a particular time. For example, a switch can be used to select a particular antenna from a group of antennas based on a variety of factors, such as an observed bit error rate and/or a signal-strength indicator.

The baseband system 101 is coupled to the user interface 107 to facilitate processing of various user input and output (I/O), such as voice and data. The baseband system 101 provides the transceiver 102 with digital representations of transmit signals which the transceiver 102 processes to generate RF signals for transmission. The baseband system 101 also processes digital representations of received signals provided by the transceiver 102. As shown in FIG. 1, the baseband system 101 is coupled to the memory 106 to facilitate operation of the mobile device 100.

The memory 106 can be used for a wide variety of purposes, such as storing data and/or instructions to facilitate the operate of the mobile device 100 and/or to provide storage of information, such as user information. In some examples, the memory 106 may be coupled to at least one controller configured to control operate of the mobile device 100. For example, the mobile device 100 may include the at least one controller. The at least one controller may be coupled to one or more components of the mobile device 100 and, in some examples, the mobile device 100 includes the at least one controller. The memory 106 may include one or more non-transitory computer-readable media configured to store instructions, which the at least one controller may be configured to read to operate the mobile device 100.

The power-management system 105 provides a number of power-management functions of the mobile device 100. In certain implementations, the power-management system 105 includes a PA-supply control circuit which controls the supply voltages of the power amplifiers 111. For example, the power-management system 105 can be configured to change the supply voltage(s) provided to one or more of the power amplifiers 111 to improve efficiency, such as power-added efficiency (PAE).

As shown in FIG. 1, the power-management system 105 receives a battery voltage from the battery 108. The battery 108 can be any suitable battery for use in the mobile device 100, including, for example, a lithium-ion battery.

In one example, the FEM 103 may support sounding reference signal (SRS) functionality to provide an estimate or characterization of the uplink (that is, transmit) channel quality over a wide bandwidth. In some examples, the SRS is an RF signal. The FEM 103 may transmit an SRS to a base station and the base station may utilize or analyze the received SRS to estimate channel quality and determine resource (for example, channel) allocations. In some examples, the SRS may provide information corresponding to multipath fading, scattering, Doppler effects, power loss, and other radio frequency transmission characteristics. In certain cases, the FEM 103 may be configured as a 5G system and may utilize SRS functionality to support 5G communication. In some cases, SRS support on each TX/RX antenna of the FEM 103 (for example, antenna 104) may be a requirement and/or may be desirable for 5G systems (or devices).

In many cases, wireless-communication devices include multiple FEMs. The multiple FEMs may be included in a FEM system having an integrated SRS implementation. To support full SRS functionality, the transmit path(s) of each FEM may be connected to the transmit/receive path(s) of each other FEM of the FEM system via respective ports (or pins). As such, each FEM of the FEM system (including, for example, FEM 103) may include a multi-port (or pin) SRS interface. For example, the FEM 103 may include an input SRS port to receive an SRS from another FEM included in the FEM system. Likewise, the FEM 103 may include an output SRS port to provide an SRS to another FEM included in the FEM system.

In some cases, each additional SRS port of the multi-port SRS interfaces of each FEM can reduce the input/output (IO) availability of the FEM and increase the overall package size of the FEM. In addition, routing between the multi-port SRS interfaces of each FEM can occupy valuable area within the wireless-communication device (for example, on a circuit board). In certain cases, to support these multi-port SRS interfaces, the FEMs may include larger antenna switching modules which incur additional losses and occupy additional area within the FEMs (and the wireless-communication device that includes the FEMs).

In light of the foregoing, an improved FEM and FEM system is provided herein. In at least one embodiment, each FEM in a multi-FEM system includes a single-port SRS interface configured to receive an SRS and to provide an SRS. In some examples, the FEM includes a simplified antenna switching module that incurs reduced losses. In addition, the FEM can be included in the FEM system with reduced routing between the SRS interfaces of each FEM.

Figure 2:
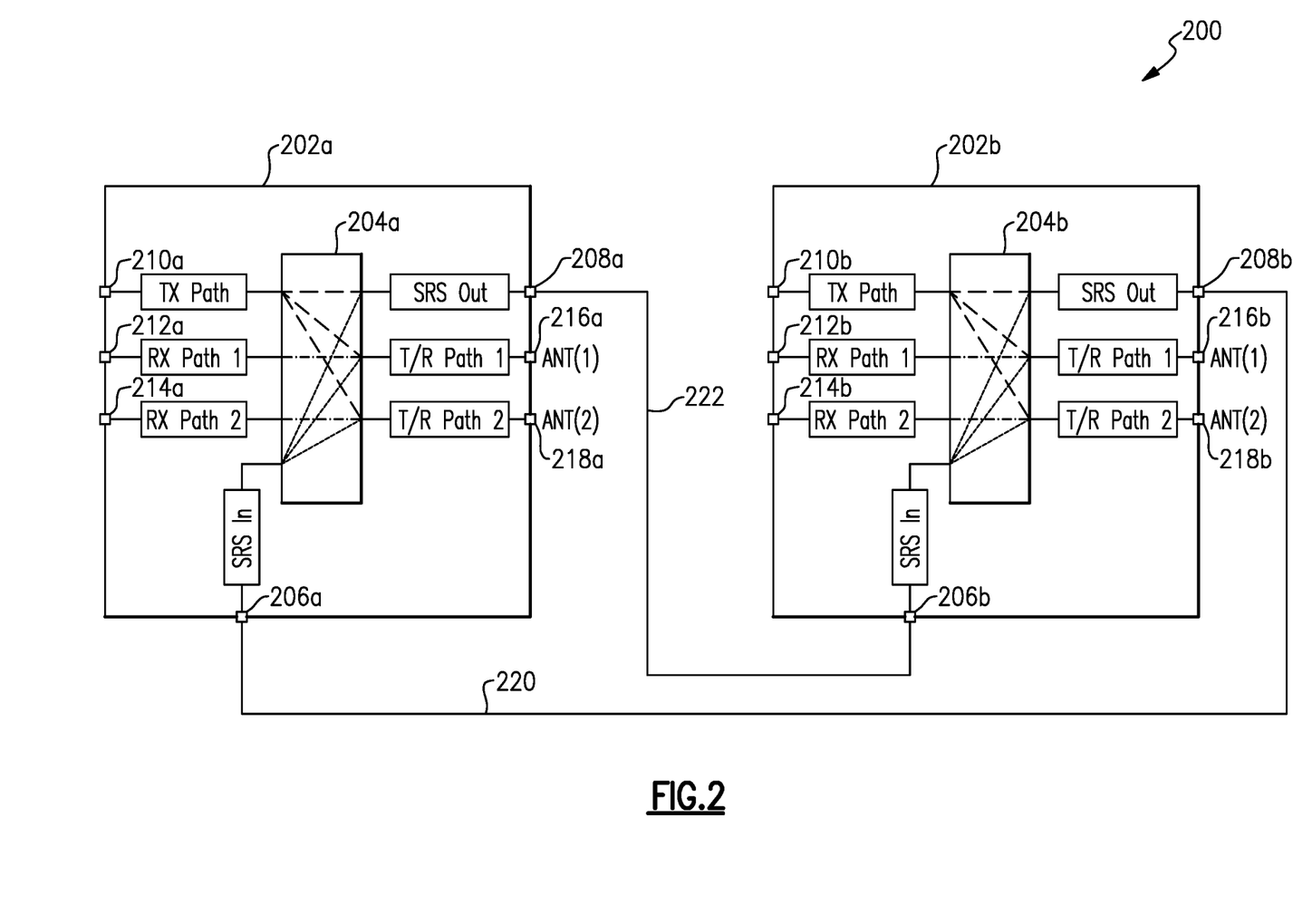
FIG. 2 illustrates a block diagram of a front-end module system according to an example.

FIG. 2 illustrates a block diagram of a FEM system 200 according to an example. In some examples, the FEM system 200 may be included in a wireless-communication device, such as the mobile device 100. For example, the FEM system 200 may be an implementation of the FEM 103. The FEM system 200 includes a first FEM 202a and a second FEM 202b (collectively, FEMs 202). The FEMs 202 may each be an example of, or included in, the FEM 103. In at least one example, each of the FEMs 202a, 202b is substantially identical to one another. For purposes of example, each of the FEMs 202a, 202b is illustrated in a one-transmit (including, for example, one PA), two-receive (including, for example, two LNAs) arrangement such that the FEM system 200 as a whole depicts a two-transmit, four-receive arrangement (2T4R). It is appreciated that this arrangement is illustrated for purposes of example only, and that different arrangements are within the scope of the disclosure.

The first FEM 202a includes a first antenna switch module (ASM) 204a, a first SRS input port 206a (or pin), a first SRS output port 208a (or pin), a first transmit port 210a (or pin), a first receive port 212a (or pin), a second receive port 214a (or pin), a first antenna port 216a (or pin), and a second antenna port 218a (or pin). The second FEM 202b includes a second ASM 204b, a second SRS input port 206b (or pin), a second SRS output port 208b (or pin), a second transmit port 210b (or pin), a third receive port 212b (or pin), a fourth receive port 214b (or pin), a third antenna port 216b (or pin), and a fourth antenna port 218b (or pin). Like-named components of the FEMs 202a, 202b may be referred to collectively herein, such as by referring to the ASMs 204a, 204b collectively as the "ASMs 204." Similar principles apply to the FEMs 202 themselves.

Each of the ASMs 204 is configured to be coupled to respective ports 208-218, that is, the ASM 204a is configured to be coupled to the SRS input port 206a, the SRS output port 208a, and so forth, and the ASM 204b is configured to be coupled to the SRS input port 206b, the SRS output port 208b, and so forth. The first SRS input port 206a is coupled to the first ASM 204a via an SRS-input path (labeled "SRS In"), and is configured to be coupled to the second SRS output port 208b via a first trace 220. The first SRS output port 208a is coupled to the first ASM 204a via an SRS-output path ("SRS Out"), and is configured to be coupled to the second SRS input port 206b via a second trace 222.

The first transmit port 210a is coupled to the first ASM 204a via a transmit path ("TX Path"), and is configured to be coupled to a transceiver (not illustrated in FIG. 2), such as the transceiver 102. The first receive port 212a and the second receive port 214a are each coupled to the first ASM 204a via respective receive paths ("RX Path 1" and "RX Path 2," respectively), and are each configured to be coupled to a transceiver, such as the transceiver 102. The first antenna port 216a and the second antenna port 218a are each coupled to the first ASM 204a via respective transmit/receive paths ("T/R Path 1" and "T/R Path 2," respectively), and are each configured to be coupled to a respective antenna (not illustrated in FIG. 2), such as in connection with the antennas 104.

The second SRS input port 206b is coupled to the second ASM 204b via an SRS-input path ("SRS In"), and is configured to be coupled to the first SRS output port 208a via the second trace 222. The second SRS output port 208b is coupled to the second ASM 204b via an SRS-output path ("SRS Out"), and is configured to be coupled to the first SRS input port 206a via the first trace 220.

The second transmit port 210b is coupled to the second ASM 204b via a transmit path ("TX Path"), and is configured to be coupled to a transceiver, such as the transceiver 102. The third receive port 212b and the fourth receive port 214b are each coupled to the second ASM 204b via respective receive paths ("RX Path 1" and "RX Path 2," respectively), and are each configured to be coupled to a transceiver, such as the transceiver 102. The third antenna port 216b and the fourth antenna port 218b are each coupled to the second ASM 204b via respective transmit/receive paths ("T/R Path 1" and "T/R Path 2," respectively), and are each configured to be coupled to a respective antenna, such as in connection with the antennas 104.

At least because each of the identified paths may be coupled to a respective port, it is to be appreciated that providing a signal to, from, via, and so forth, a port may be understood to be providing the signal to, from, via, and so forth, a corresponding path. For example, a signal provided at the first antenna port 216a may be understood to be provided via the T/R Path 1 of the first FEM 202a, an SRS output at the first SRS output 208a may be understood to be provided via the SRS Out path, and so forth.

In various examples, the ASMs 204 are controlled or operated to connect the transmit ports 210 and the receive ports 212, 214 of each respective FEM 202 to respective antenna ports 216, 218. FIG. 2 illustrates several example switchable connections that the ASMs 204 may facilitate or establish based on one or more control signals, and it is to be appreciated that in other examples, the ASMs 204 may facilitate or establish additional, fewer, or different switchable connections. In some examples, the FEM system 200 and/or the mobile device 100 includes at least one controller configured to control the ASMs 204, such as by opening and/or closing one or more switchable connections. The at least one controller may be coupled to the memory 106 as discussed above.

Transmit/receive paths ("T/R paths") corresponding to each of the antenna ports 216, 218 are coupled between the ASMs 204 and the respective antenna ports. In some examples, each T/R path includes a band-pass filter corresponding to the wireless application of the FEM system 200 (for example, 5G).

In a transmit mode of operation, the ASMs 204 may be operated to connect the transmit port 210 (and, by extension, the TX Path) of each respective FEM 202 to one of the respective antenna ports 216, 218 (and, by extension, the T/R Path 1 or the T/R Path 2). As understood by one of ordinary skill in the art, an ASM may include a plurality of switchable connections such that one connection to the ASM may be coupled to another connection to the ASM. FIG. 2 illustrates switchable connections within the ASMs 204 that may be established in some examples, and in alternate examples, different connections may be established.

Likewise, in a receive mode of operation, the ASMs 204 may be operated to connect at least one of the receive ports 212, 214 (and, by extension, at least one of the RX Path 1 or the RX Path 2) to the antenna ports 216, 218 (and, by extension, the T/R Path 1 and the T/R Path 2). For example, the ASMs 204 can be operated to connect each of the receive ports 212, 214 to a respective one of the antenna ports 216, 218, thereby connecting each of the receive paths (RX Path 1, RX Path 2) to a respective one of the T/R paths (T/R Path 1, T/R Path 2). In some cases, in a transmit/receive mode of operation, the ASMs 204 may be operated to connect the transmit ports 210 (via the TX Path) to one of the antenna ports 216, 218 (via T/R Path 1 or T/R Path 2) and to connect one of the receive ports 212, 214 (via RX Path 1 or RX Path 2) to the other antenna port 216, 218 (via T/R Path 2 or T/R Path 1). In certain examples, the FEMs 202 can be controlled in unison (for example, in the same mode of operation). In other examples, the FEMs 202 may be controlled independently.

In one example, the FEM system 200 is configured with full SRS functionality. To support full SRS functionality, each transmit path in the FEM system 200 may be connected to each respective T/R path. For example, in the first FEM 202a, the TX path coupled to the transmit port 210a may be coupled to the T/R Path 1 coupled to the first antenna port 216a and to the T/R Path 2 coupled to the second antenna port 218a.

The ASMs 204 can be controlled to connect each transmit path to each respective T/R path within the FEMs 202. However, in order to connect the transmit path of the first FEM 202a to the T/R paths of the second FEM 202b (or vice versa), an SRS interface is included in each of the FEMs 202. For example, the first FEM 202a includes the first SRS input port 206a and the first SRS output port 208a, and the second FEM 202b includes the second SRS input port 206b and the second SRS output port 208b.

As discussed above, the first SRS input port 206a is coupled to the second SRS output port 208b via the first trace 220, and the first SRS output port 206b is coupled to the second SRS input port 206b via the second trace 222. As such, when a first SRS is provided from the first transmit port 210a, the ASM 204a may be controlled to provide the first SRS to the first antenna port 216a, the second antenna port 218a, and the first SRS output port 208a via the T/R Path 1, T/R Path 2, and SRS Out path, respectively, of the first FEM 202a. For example, the first ASM 204a can be operated to switchably connect the TX Path of the first FEM 204a to the T/R Path 1, the T/R Path 2, and the SRS Out path of the first FEM 202a.

The first SRS is provided from the first SRS output port 208a to the second SRS input port 206b of the second FEM 202b via the first signal trace 222, and the second ASM 204b is controlled to provide the first SRS to the third antenna port 216b and the fourth antenna port 218b of the second FEM 202b. For example, the second ASM 204b can be operated to connect the second SRS input port 206b of the second FEM 202b to each of the antenna ports 216b, 218b of the second FEM 202b. In some examples, the second ASM 204b may be operated to connect the second SRS input port 206b to the second SRS output port 208b of the second FEM 202b.

Similarly, when a second SRS is provided from the second transmit port 210b of the second FEM 202b, the second ASM 204b is controlled to provide the second SRS to the third antenna port 216b, the fourth antenna port 218b, and the second SRS output port 208b via the T/R Path 1, the T/R Path 2, and the SRS Out path, respectively, of the second FEM 202b. For example, the second ASM 204b can be operated to switchably connect the TX Path of the second FEM 204b to the T/R Path 1, the T/R Path 2, and the SRS Out path of the second FEM 202b. The second SRS is provided from the second SRS output port 208b to the first SRS input port 206a of the first FEM 202a via the first signal trace 220 and the first ASM 204a is controlled to provide the second SRS to the T/R Path 1 and the T/R Path 2 of the first FEM 202a. For example, the first ASM 204a can be operated to connect the first SRS input port 206a of the first FEM 202a to each of the antenna ports 216a, 218a of the first FEM 202a. In some examples, the first ASM 204a may be operated to connect the first SRS input port 206a to the first SRS output port 208a of the first FEM 202a. In some examples, the first SRS and the second SRS may be the same signal. In other examples, the first SRS and the second SRS may be different signals.

As described above, the traces 220, 222 between the SRS ports 206, 208 may occupy valuable area within a wireless-communication device (for example, on a circuit board). In some examples, given that the SRS may be an RF signal, the traces 220, 222 may be RF transmission lines having specific characteristics (for example, length, width, and so forth) and routing limitations (for example, cross-talk spacing). As such, the inclusion of traces 220, 222 can increase the complexity of signal routing within the wireless-communication device. In addition, the SRS ports 206, 208 of each of the FEMs 202 may reduce the input/output (IO) availability of each of the FEMs 202 and increase the overall package size of the FEMs 202. For example, in one example of a 24-pin device package, the input and output SRS-interface pins may occupy about 8% of the total IO availability. As such, a larger device package (and thus more pins) may be needed to include the multi-port SRS interface while maintaining full FEM functionality. In some examples, the pin selections for the SRS interface may dictate or otherwise affect the orientation of the FEMs 202, thus increasing the design/layout complexity of the FEM system 200 (or the wireless device).

In addition, being that in some examples the ASMs 204 are configured to direct an SRS between the transmit and T/R paths of the FEMs 202 and provide regular transmit/receive functionality, the ASMs 204 may be large and complex. For example, the ASMs 204 may include input/output ports corresponding to the multi-port SRS interface of each of the FEMs 202. In some examples, the ASMs 204 can incur additional losses and occupy additional area within the FEMs 202 due to the inclusion of additional ports for the multi-port SRS interfaces. As such, an improved FEM and FEM system may be desired to simplify the SRS interface, the associated signal routing, and a respective ASM included in each FEM.

Figure 3:
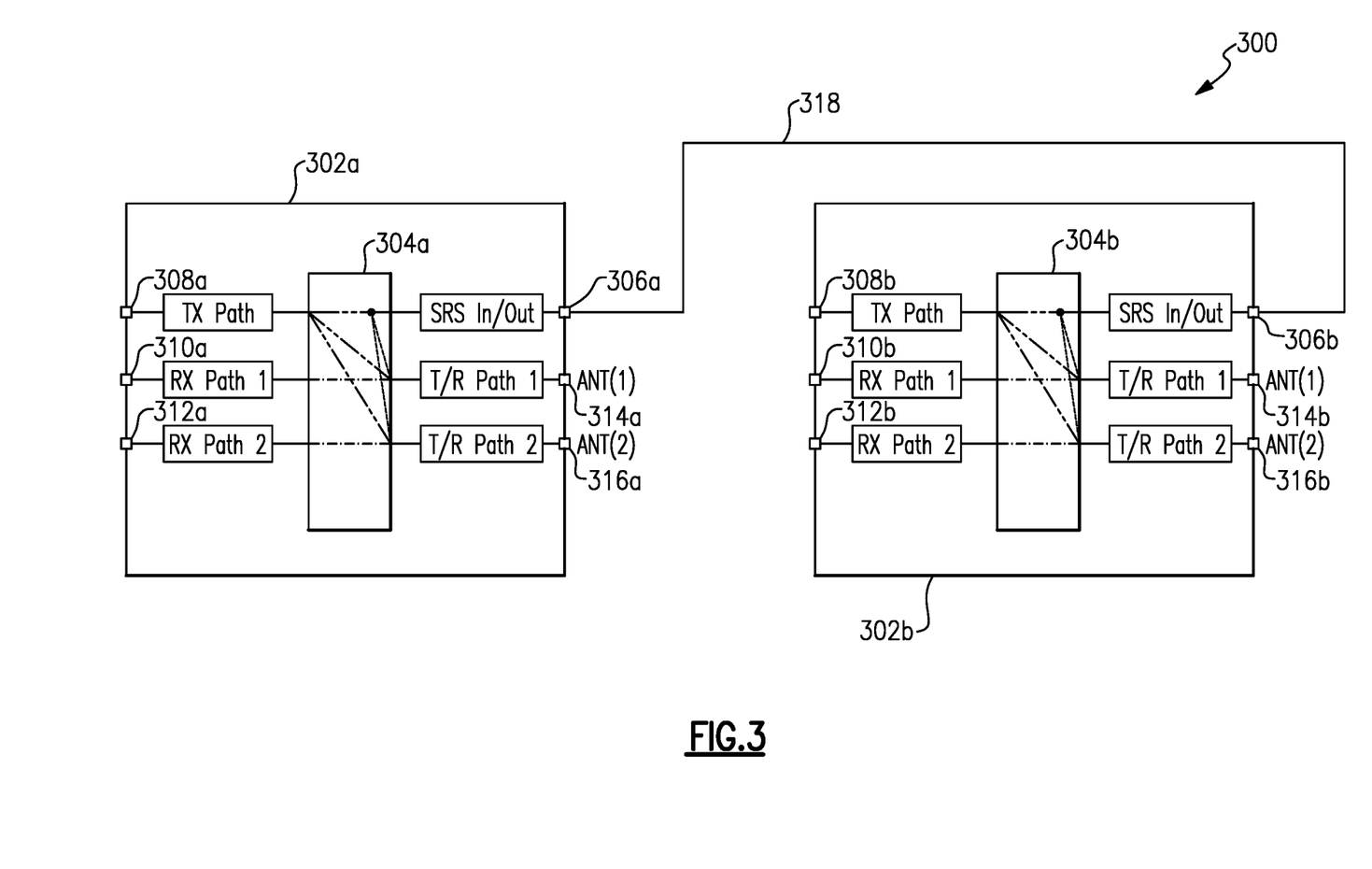
FIG. 3 illustrates a block diagram of a front-end module system according to an example.

FIG. 3 illustrates a block diagram of a FEM system 300 according to an example. As shown, the FEM system 300 includes a first FEM 302a and a second FEM 302b. In one example, the FEM system 300 is substantially similar to the FEM system 200 of FIG. 2, except the FEMs 302a, 302b each include a single-port SRS interface. For example, the first FEM 302a includes a first SRS input/output port 306a, and the second FEM 302b includes a second SRS input/output port 306b. In one example, the first SRS input/output port 306a is coupled to the second SRS input/output port 306b via a trace 318.

The first FEM 302a includes a first ASM 304a, the first SRS input/output port 306a, a first transmit port 308a, a first receive port 310a, a second receive port 312a, a first antenna port 314a, and a second antenna port 316a. The second FEM 302b includes a second ASM 304b, the second SRS input/output port 306b, a second transmit port 308b, a third receive port 310b, a fourth receive port 312b, a third antenna port 314b, and a fourth antenna port 316b. The connections of the ports 308-316 are substantially similar or identical to the like-named ports 210-218, respectively, and are not repeated for purposes of brevity.

In one example, the first ASM 304a can be operated to connect the first transmit port 308a to any of the first SRS input/output port 306a, the first antenna port 314a, and the second antenna port 316a. The first ASM 304a may also be operated to connect each of the receive ports 310a, 312a to any of the antenna ports 314a, 316a, and to connect the first SRS input/output port 306a to any of the antenna ports 314a, 316a.

Similarly, the second ASM 304b can be operated to connect the second transmit port 308b to any of the second SRS input/output port 306b, the third antenna port 314b, and the fourth antenna port 316b. The second ASM 304b may also be operated to connect each of the receive ports 310b, 312b to any of the antenna ports 314b, 316b, and to connect the second SRS input/output port 306b to any of the antenna ports 314b, 316b. In other examples, the ASMs 304 may be configured differently (for example, enabling additional, fewer, or different interconnections).

In some examples, when a first SRS is provided from the transmit port 308a of the first FEM 302a, the first ASM 304a is controlled to provide the first SRS to the antenna ports 314a, 316a and to the first SRS input/output port 306a. For example, the first ASM 304a can be operated to connect the transmit port 308a of the first FEM 302a to each of the antenna ports 314a, 316a, and to the first SRS input/output port 306a. The first SRS may be provided from the first SRS input/output port 306a to the second SRS input/output port 306b of the second FEM 302b via the trace 318. The second ASM 304b may be controlled to provide the first SRS to the antenna ports 314b, 316b. For example, the second ASM 304b can be operated to connect the second SRS input/output port 306b to either of the antenna ports 314b, 316b.

Similarly, when a second SRS is provided from the transmit port 308b of the second FEM 302b, the second ASM 304b is controlled to provide the second SRS to the second SRS input/output port 306b, the third antenna port 314b, and the fourth antenna port 316b. For example, the second ASM 304b can be operated to connect the transmit port 308b to each of the antenna ports 314b, 316b and the second SRS input/output port 306b. The second SRS is provided from the second SRS input/output port 306b to the first SRS input/output port 306a via the signal trace 318. The first ASM 304a may be controlled to provide the second SRS to the antenna ports 314a, 316a. For example, the first ASM 304a can be operated to connect the first SRS input/output port 306a to either of the antenna ports 314a, 316a.

In one example, the area occupied by the FEM system 300 is less than an area occupied by the FEM system 200. For example, an area occupied by the SRS input/output ports 306, and the trace 318 therebetween, may be less than the area occupied by the SRS input ports 206, the SRS output ports 208, and the traces 220, 222. In some examples, the implementation of the SRS ports 306 may reduce the overall routing complexity of the FEM system 300 relative to other systems, such as the FEM system 200. In addition, the implementation of the SRS input/output ports 306 may increase the IO availability of the FEM system 300 and/or reduce the overall package size of the FEM system 300 relative to other arrangements, such as the FEM system 200.

For example, in a 24-pin device package, the SRS input/output ports 306 and associated routing may occupy only about 4% of the total IO availability. As such, the SRS input/output ports 306 can be included in a standard (or smaller) package size (as compared to the FEM system 200, for example) while maintaining full FEM functionality. In some examples, the SRS input/output ports 306 may provide additional flexibility in the orientation of the FEMs 302, reducing the design and/or layout complexity of the FEM system 300 (or a device in which the FEM system 300 is implemented).

In addition, being that an SRS may be directed between the transmit ports 308 and antenna ports 314, 316 via the SRS input/output ports 306, the size and complexity of the ASMs 304 can be reduced (for example, relative to multi-port SRS interfaces, such as those implemented in connection with the FEM system 200). For example, rather than including discrete input and output ports for the SNS interface, the ASMs 304 may each include a single input/output port corresponding to the SRS input/output ports 306. In some examples, losses incurred by the ASMs 304 and the area occupied within the FEMs 302 by the ASMs 304 can be reduced due to the reduction of ports for the SRS interface relative to other arrangements, such as the FEM system 200.

Figure 4:
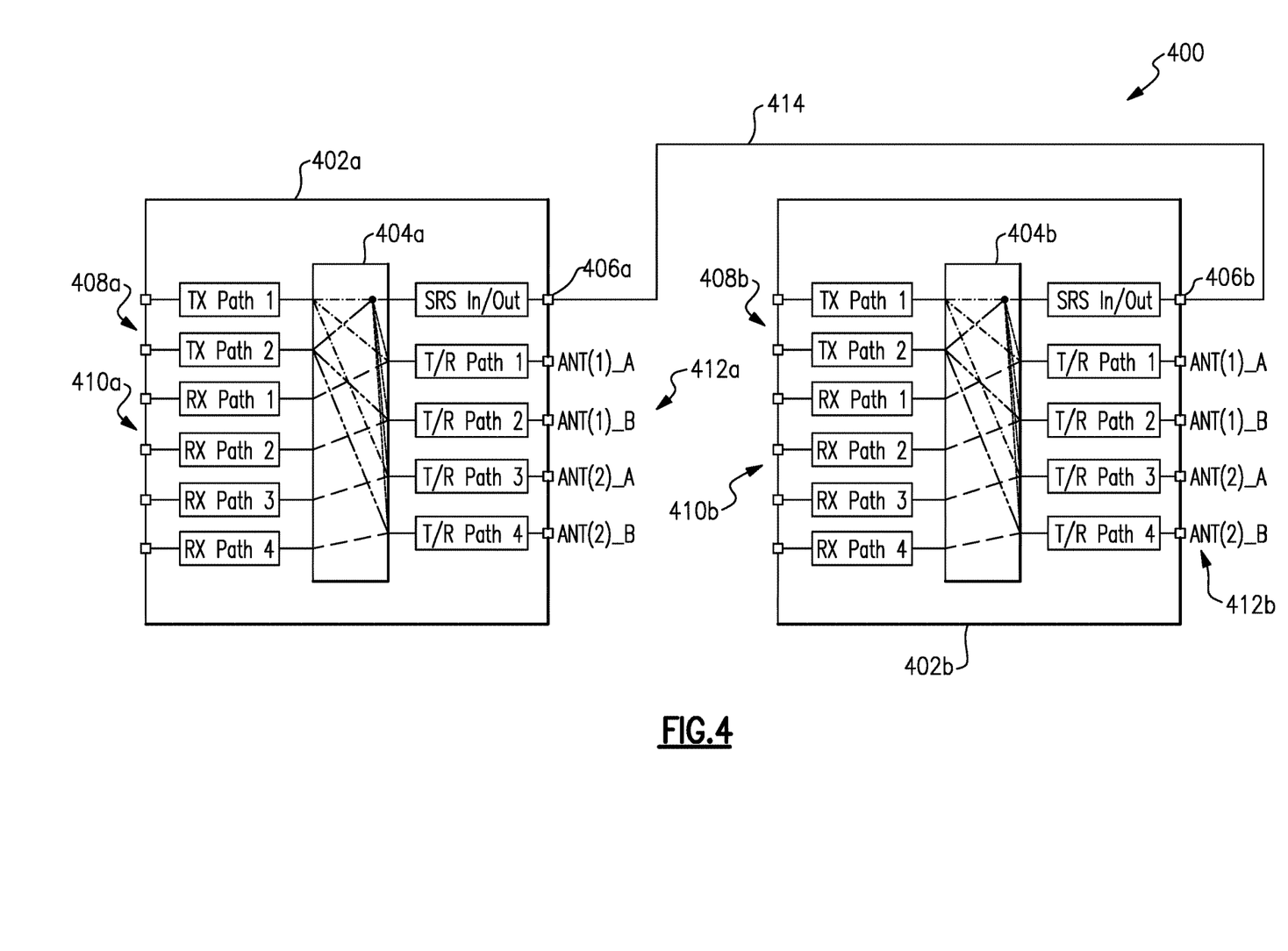
FIG. 4 illustrates a block diagram of a front-end module system according to an example.

It should be appreciated that the FEM system 300 is configured with a two-transmit, four-receive arrangement (2T4R) for purposes of example only. Similar SRS interfaces can be included in different FEM configurations. For example, FIG. 4 illustrates a block diagram of a FEM system 400 according to an example. As shown, the FEM system 400 includes a first FEM 402a and a second FEM 402b. In one example, the FEM system 400 is substantially similar to the FEM system 300 of FIG. 3, except the FEMs 402 are each configured with additional transmit and receive ports.

For example, the first FEM 402a includes a first ASM 404a, a first SRS input/output port 406a, a first plurality of transmit ports 408a, a first plurality of receive ports 410a, and a first plurality of antenna ports 412a. The second FEM 402b includes a second ASM 404b, a second SRS input/output port 406b, a second plurality of transmit ports 408b, a second plurality of receive ports 410b, and a second plurality of antenna ports 412b. The first SRS input/output port 406a is coupled to the second input/output port 406b via a trace 414.

In one example, the pluralities of transmit ports 408 each include two transmit ports, the pluralities of receive ports 410 each include four receive ports, and the pluralities of antenna ports 412 each include four antenna ports such that the FEM system 400 may be configured in a four-transmit, eight-receive (4T8R) configuration. However, it is to be appreciated that in other examples, each of the pluralities may include additional or fewer ports. In various examples, each of the FEMs 402 includes only a single respective SRS input/output port for any arbitrary number of transmit, receive, and/or antenna ports.

In one example, the first ASM 404a can be operated to connect any transmit port of the first plurality of transmit ports 408a to any antenna port of the first plurality of antenna ports 412a, and to the first SRS input/output port 406a. The first ASM 404a may also be operated to connect any receive port of the first plurality of receive ports 410a to any antenna port of the first plurality of antenna ports 412a, and to connect the first SRS input/output port 406a to any antenna port of the first plurality of antenna ports 412a.

Similarly, the second ASM 404b can be operated to connect any transmit port of the second plurality of transmit ports 408b to any antenna port of the second plurality of antenna ports 412b, and to the second SRS input/output port 406b. The second ASM 404b may also be operated to connect any receive port of the second plurality of receive ports 410b to any antenna port of the second plurality of antenna ports 412b, and to connect the second SRS input/output port 406b to any antenna port of the second plurality of antenna ports 412b. In other examples, the ASMs 404 may be configured differently (for example, enabling additional, fewer, or different interconnections).

In some examples, when the SRS is provided from one of the transmit ports of the first plurality of transmit ports 408a, the first ASM 404a is controlled to provide a first SRS to at least one antenna port of the first plurality of antenna ports 412a and/or to the first SRS input/output port 406a. For example, the first ASM 404a may be operated to connect any of the transmit ports of the first plurality of transmit ports 408a to any antenna port of the first plurality of antenna ports 412a and to the first SRS input/output port 406a. The first SRS is provided from the first SRS input/output port 406a to the second SRS input/output port 406b via the trace 414. The second ASM 404b may be controlled to provide the first SRS to any antenna port of the second plurality of antenna ports 412b. For example, the second ASM 404b can be operated to connect the second SRS input/output port 406b to any antenna port of the second plurality of antenna ports 412b.

Similarly, when a second SRS is provided from a transmit port of the second plurality of transmit ports 408b, the second ASM 404b may be controlled to provide the second SRS to any antenna port of the second plurality of antenna ports 412b and/or to the second SRS input/output port 406b. For example, the second ASM 404b can be operated to connect any of the transmit ports of the second plurality of antenna ports 408b to any of the antenna ports of the second plurality of antenna ports 412b and to the second SRS input/output port 406b. The second SRS is provided from the second SRS input/output port 406b to the first SRS input/output port 406b via the trace 404. The first ASM 404a may be controlled to provide the second SRS to any antenna port of the first plurality of antenna ports 412a. For example, the first ASM 404a can be operated to connect the first SRS input/output port 406a to any antenna port of the first plurality of antenna ports 412a.

In some examples, the first SRS and the second SRS may be the same signal. In other examples, the first SRS and the second SRS may be different signals.

In one example, an area occupied by the SRS ports and/or routing in the FEM system 400 may be reduced relative to a 4T8R system in which multiple SRS input ports and multiple SRS output ports are implemented. In some examples, the SRS input/output ports 406 of the FEMs 402 can reduce the overall routing complexity of the FEM system 400 relative to other arrangements, such as the FEM system 200. In addition, the SRS input/output ports 406 may increase the IO availability of each FEM 402 and/or reduce the overall package size of each FEM 402 relative to other arrangements, such as the FEM system 200. For example, in a 24-pin device package, the SRS-interface pin may occupy only about 4% of the total IO availability. As such, the SRS input/output ports 406 may be included in a standard (or smaller) package size while maintaining full FEM functionality. In some examples, the SRS input/output ports 406 may provide additional flexibility in the orientation of the FEMs 402, reducing the design/layout complexity of the FEM system 400 (or the wireless device).

In addition, the size and/or complexity of the ASMs 404 may be reduced by implementing the SRS input/output ports 406. For example, rather than including discrete input and output ports to couple to an SRS interface, each of the ASMs 404 may include a single input/output port to be coupled to a respective one of the SRS input/output ports 406. In some examples, losses incurred by the ASMs 404 and the area occupied within the FEMs 402 by the ASMs 404 can be reduced due to the reduction of ports for the SRS interface relative to other arrangements, such as the FEM system 200.

It should be appreciated that while the FEM systems 300, 400 have been described above with reference to various 5G cellular applications, similar FEM architectures may be used in different wireless applications. For example, the FEM systems 300, 400 may be configured for use in wireless local area network (WLAN), ultra-wideband (UWB), wireless personal area network (WPAN), 4G cellular, LTE cellular applications, and so forth. In addition, the single-port interfaces of each FEM may be configured for different calibration or characterization purposes corresponding to the specific application of use.

In some examples, one or more components of the FEMs 302, 402 included in the FEM systems 300, 400 may include gallium arsenide (GaAs) heterojunction bipolar transistors (HBT) and/or silicon germanium (SiGe) HBTs. In certain examples, the FEMs or one or more components of the FEMs may be fabricated using silicon-on-insulator (SOI) techniques.

Embodiments of the FEMs 302, 402 and/or the FEM systems 300, 400 described herein may be advantageously used in a variety of electronic devices. Examples of the electronic devices can include, but are not limited to, consumer electronic products, parts of consumer electronic products, electronic test equipment, cellular communications infrastructure such as a base station, etc. Examples of the electronic devices can include, but are not limited to, a router, a gateway, a mobile phone such as a smart phone, a telephone, a television, a computer monitor, a computer, a modem, a hand-held computer, a laptop computer, a tablet computer, an electronic book reader, a wearable computer such as a smart watch, a personal digital assistant (PDA), an appliance, such as a microwave, refrigerator, or other appliance, an automobile, a stereo system, a DVD player, a CD player, a digital music player such as an MP3 player, a radio, a camcorder, a camera, a digital camera, a portable memory chip, a health-care-monitoring device, a vehicular electronics system such as an automotive electronics system or an avionics electronic system, a peripheral device, a wrist watch, a clock, etc. Further, the electronic devices can include unfinished products.

In light of the foregoing, an improved FEM and FEM system are provided herein. In at least one embodiment, the FEM includes a single-pin SRS interface configured to receive an SRS and to provide an SRS. In some examples, the FEM includes a simplified antenna switching module that incurs reduced losses. In addition, the FEM can be included in the FEM system with reduced routing between the SRS interfaces of each FEM.

It is to be appreciated that example FEMs and FEM systems provided herein are provided for purposes of explanation. In some examples, certain FEMs and/or FEM systems may include additional, fewer, or different components than those illustrated. Certain FEMs and/or FEM systems may include additional components that have not been illustrated for purposes of clarity. For example, one or more of the FEMs 302a, 302b, 410, 420 may include an interface configured according to the Mobile Industry Processor Interface (MIPI) standard and having one or more ports or pins, one or more voltage input or output ports or pins, one or more filters, one or more amplifiers (including, for example, PAs, LNAs, and so forth), one or more coupling elements, one or more coupler ports or pins, one or more resistors, inductors, and/or capacitors, one or more switches, and so forth.

Having described above several aspects of at least one embodiment, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:

1. A front-end module for a wireless device, the front-end module comprising:
    at least one transmit path configured to provide a first sounding reference signal;
    at least one transmit/receive path coupled to at least one antenna port;
    a sounding-reference-signal port configured to provide the first sounding reference signal and to receive a second sounding reference signal;
    an antenna switch module coupled between the at least one transmit path, the at least one transmit/receive path, and the sounding-reference-signal port, the antenna switch module being configured to provide the first sounding reference signal from the at least one transmit path to the at least one transmit/receive path and the sounding-reference-signal port and to provide the second sounding reference signal received at the sounding-reference-signal port to the at least one transmit/receive path.

2. The front-end module of claim 1 wherein the first sounding reference signal and the second sounding reference signal are provided to the at least one transmit/receive path to be transmitted by one or more antennas coupled to the at least one antenna port.

3. The front-end module of claim 2 wherein the first sounding reference signal and the second sounding reference signal are transmitted to at least one base station to characterize an uplink channel between the wireless device and the base station.

4. The front-end module of claim 1 wherein the first sounding reference signal is provided from the sounding-reference-signal port to a second front-end module included in the wireless device.

5. The front-end module of claim 4 wherein the second sounding reference signal is received from the second front-end module.

6. The front-end module of claim 1 wherein the at least one transmit path includes at least one power amplifier.

7. The front-end module of claim 1 wherein the at least one transmit/receive path includes at least one low-noise amplifier.

8. The front-end module of claim 1 wherein the front-end module is configured to support 5G wireless communication.

9. The front-end module of claim 1 wherein the antenna switch module includes a single pin connection configured to be coupled to the sounding-reference-signal port.

10. A mobile-communications-device system comprising:
a first front-end module including
a first sounding-reference-signal port configured to provide a first sounding reference signal and to receive a second sounding reference signal; and
a first antenna switch module coupled to the first sounding-reference-signal port, the first antenna switch module being configured to route the first sounding reference signal to the first sounding-reference-signal port and to route the second sounding reference signal from the first sounding-reference-signal port; and
a second front-end module including
a second sounding-reference-signal port configured to provide the second sounding reference signal to the first front-end module and to receive the first sounding reference signal from the first front-end module; and
a second antenna switch module coupled to the second sounding-reference-signal port, the second antenna switch module being configured to route the second sounding reference signal to the second sounding-reference-signal port and to route the first sounding reference signal from the second sounding-reference-signal port.

11. The mobile-communications-device system of claim 10 wherein
the first front-end module includes at least one first transmit path coupled to the first antenna switch module, the first antenna switch module being configured to route the first sounding reference signal from the at least one first transmit path to the first sounding-reference-signal port, and
the second front-end module includes at least one second transmit path coupled to the second antenna switch module, the second antenna switch module being configured to route the second sounding reference signal from the at least one second transmit path to the second sounding-reference-signal port.

12. The mobile-communications-device system of claim 10 wherein
the first front-end module includes at least one first transmit/receive path coupled to at least one first antenna port and coupled to the first antenna switch module, the first antenna switch module being configured to route the second sounding reference signal from the first sounding-reference-signal port to the at least one first transmit/receive path, and
the second front-end module includes at least one second transmit/receive path coupled to at least one second antenna port and coupled to the second antenna switch module, the second antenna switch module being configured to route the first sounding reference signal from the second sounding-reference-signal port to the at least one second transmit/receive path.

13. The mobile-communications-device system of claim 12 wherein
the first sounding reference signal is provided to the at least one first antenna port to be transmitted by one or more first antennas coupled to the at least one first antenna port, and
the second sounding reference signal is provided to the at least one second antenna port to be transmitted by one or more second antennas coupled to the at least one second antenna port.

14. The mobile-communications-device system of claim 13 wherein the first sounding reference signal and the second sounding reference signal are transmitted to at least one base station to characterize an uplink channel between the mobile-communications-device system and the at least one base station.

15. The mobile-communications-device system of claim 10 wherein
the first antenna switch module includes a single pin connection configured to be coupled to the first sounding-reference-signal port, and
the second antenna switch module includes a single pin connection configured to be coupled to the second sounding-reference-signal port.

16. A non-transitory computer-readable medium storing thereon sequences of computer-executable instructions for controlling a front-end module for a wireless device comprising a sounding-reference-signal port, at least one transmit path, at least one transmit/receive path coupled to at least one antenna port, and an antenna switch module coupled between the sounding-reference-signal port, the at least one transmit path, and the at least one transmit/receive path, the sequences of computer-executable instructions including instructions that instruct at least one processor to:
control the antenna switch module to route a first sounding reference signal from the at least one transmit path to the sounding-reference-signal port; and
control the antenna switch module to route a second sounding reference signal from the sounding-reference-signal port to the at least one transmit/receive port.

17. The non-transitory computer-readable medium of claim 16 wherein the instructions instruct the at least one processor to route the first sounding reference signal and the second sounding reference signal to the at least one transmit/receive path to be transmitted by one or more antennas coupled to the at least one antenna port.

18. The non-transitory computer-readable medium of claim 16 wherein the wireless device includes a transceiver, and the instructions instruct the at least one processor to route the first sounding reference signal from the transceiver and to route the second sounding reference signal to the transceiver.

19. The non-transitory computer-readable medium of claim 16 wherein the instructions instruct the at least one processor to provide the first sounding reference signal from, and receive the second sounding reference signal at, a single pin coupled to the sounding-reference-signal port.

20. The non-transitory computer-readable medium of claim 16 wherein the instructions further instruct the at least one processor to operate the front-end module pursuant to a 5G wireless-communication standard.

* * * * *